July 6, 1965 E. S. MEYER 3,192,617
HAND TOOL FOR FACILITATING THE INSERTION OF A SEAL PACKING
MATERIAL INTO A NARROW GROOVE FORMED TO RECEIVE
SAID PACKING MATERIAL
Filed May 23, 1962 2 Sheets-Sheet 1

EDWARD S. MEYER
*INVENTOR.*

BY *George B. Oujerolk*

ATTORNEY

July 6, 1965   E. S. MEYER   3,192,617
HAND TOOL FOR FACILITATING THE INSERTION OF A SEAL PACKING
MATERIAL INTO A NARROW GROOVE FORMED TO RECEIVE
SAID PACKING MATERIAL Filed May 23, 1962   2 Sheets-Sheet 2

EDWARD S. MEYER
INVENTOR.

BY George B. Onyevolle

ATTORNEY

United States Patent Office 3,192,617
Patented July 6, 1965

3,192,617
HAND TOOL FOR FACILITATING THE INSERTION OF A SEAL PACKING MATERIAL INTO A NARROW GROOVE FORMED TO RECEIVE SAID PACKING MATERIAL
Edward S. Meyer, 520 Fairfield Ave., Ridgewood, N.J.
Filed May 23, 1962, Ser. No. 196,995
1 Claim. (Cl. 29—278)

The present invention relates to the installing of long resilient elements into other components, and more particularly to the installing of a seal in an automobile crankshaft.

It is well know that the installing of the rear main seal of an automobile is a difficult task. Until recently, this was a rear-end job which took the most skilled mechanic over half a day. In the Edward S. Meyer U.S. Patent No. 3,029,503 dated April 17, 1962, I have explained how this work can be performed in a relatively short space of time without the necessity of disassembling the vehicle. This is accomplished by making use of the special hand tool described in said patent. This hand tool however has certain defects. Thus, it is necessary to pass the mesh end of the tool through machinery. This requires a certain amount of skill, otherwise, there is a tendency for the mesh to get caught. Also, it usually takes some fishing around with the mesh to pass it through the machinery. The configuration of the rear end of various automobiles are not all the same and the mechanic must learn to feel each vehicle to be about to readily pass the mesh through. Also, there is some tendency on the part of the mesh to get out of shape after several installations so that a better mesh configuration is required. Although attempts may have been made to solve these and other difficulties, none, as far as I am aware were entirely successful when carried into practice commercially on an industrial scale.

It has now been discovered that a new hand tool can be provided which is free of the foregoing defects.

Thus, an object of the present invention is to provide a hand tool which is useful in placing an elongated resilient element into other components.

A particular object of the invention is to provide a hand tool for the insertion of a packing material into a narrow groove formed to receive said material, such as the rear main seal of an automobile.

A further object of the invention is to provide a tool in which an open mesh serves to grip an elongated resilient material such as packing for a seal and provided with a handle such that the mesh and handle can be detached from one another for the purpose of winding an extension of the mesh around the crankshaft and then reengaged with one another so that the seal can be pulled into place around the crankshaft instead of being pushed into place as with the tool shown in my above noted patent.

With the foregoing brief explanation in view, the invention resides in the novel arrangement hereinafter described and claimed, it being understood that changes in the precise embodiment of the invention herein disclosed may be made within the scope of what is claimed without departing from the spirit of the invention. The invention will become apparent from the following description taken in conjunction with the accompanying drawing in which:

Figure 1:
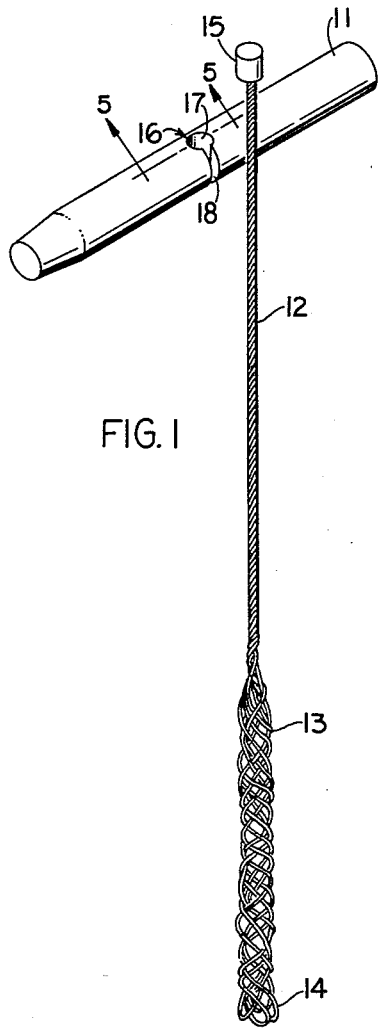
FIGURE 1 is a perspective view of the seal installer.
Figure 2:
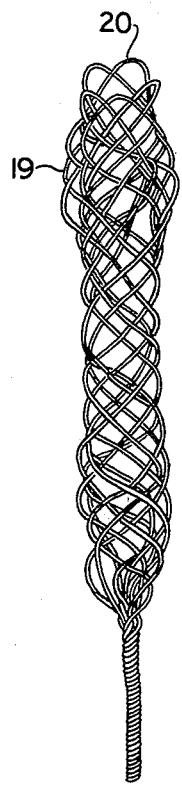
FIG. 2 shows the construction of the neck of the seal installer to readily install a seal therein.
Figure 5:
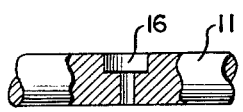
FIG. 5 is a section taken through plane 5—5 in FIG. 1.
Figure 3:
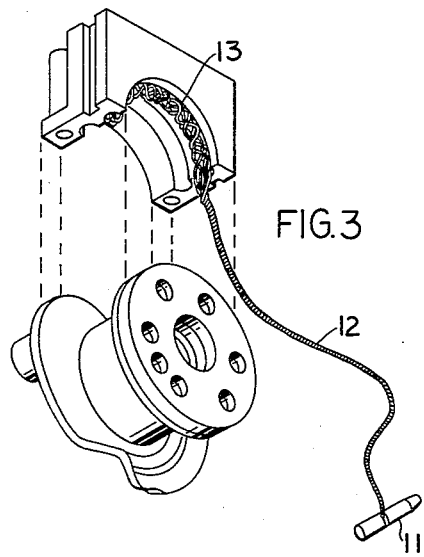
FIG. 3 depicts in a perspective view the installation of a rear main seal using the seal installer of FIG. 1.

The installer shown in FIG. 1 comprises a T-shaped handle 11, a connecting cable 12 depending from the center of the handle, and, a circular mesh 13 affixed to the cable and designed to grip an internal combustion engine seal which is inserted in the mesh weave 14. Cable 12 is not permanently affixed to handle 11. Coupled to the outer end of mesh 13 is a cylindrical boss 15, and at the center of handle 11 is a radial open slot 16. Slot 16 is divided into an upper section 17 conforming to the shape of cylindrical boss 15 and designed to receive said boss therein, and, a lower section 18 adapted to stop further penetration of the boss into the slot but permitting cable 12 to pass therethrough. Mesh 13 is so woven that the mesh weave 14 will have a throat 19 which expands when the mesh open end 20 is depressed. This throat is formed by weaving the mesh on a cylindrical form having the throat desired. After the form is removed, the mesh assumes the cylindrical shape required, but when the open end 20 is depressed, the throat has the tendency to expand rather than to contract. This feature makes the insertion of the seal into the mesh open end much simpler.

Figure 4:
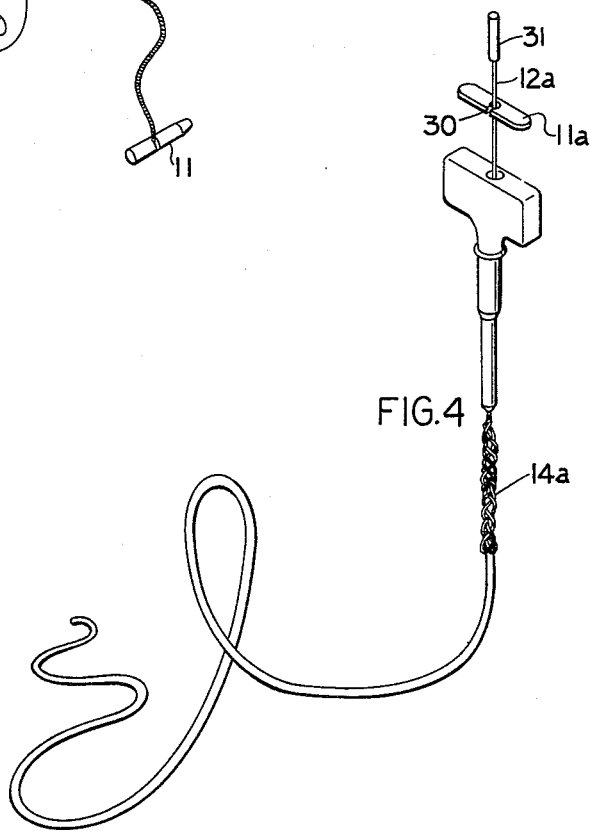
FIG. 4 shows a device similar to the seal installer of FIG. 1 used to replace an outboard starter cord.

A tool similar to that used to replace an automobile rear main seal can be used to replace the starter cord in the rewind grip of an outboard motor starter arrangement. The only difference between the devices of FIGS. 1 and 4 is that in the device of FIG. 4, mesh weave 14a has a much smaller diameter since it is designed to grip a starter cord and not a rear main seal. Cable 12a is designed to pass through retaining means 30 and has a much smaller diameter than cable 12 of FIG. 1. Cord replacement tool 31 of FIG. 4 is shown with a flat T-shaped handle 11a instead of the cylindrical handle 11.

For the purpose of giving those skilled in the art a better understanding and appreciation of the invention, the following illustrative example is given:

Example

The problem is to remove the old engine seal and to install a new seal. First, it is necessary to remove the engine oil pan, and to remove the rear main bearing cap. The seal remover used may be the one depicted in the drawing of the aforesaid Meyer U.S. Patent No. 3,029,503, or, may be an elongated cylindrical rod having a grip at one end and a pointed threaded engaging section at the other end. The old seal is engaged by the pointed threaded engaging section and the old seal is then slowly removed by pulling with the hand while rotating the crankshaft slowly with the starter. Caution must be used so as not to rotate the crankshaft too much or too fast. After the old seal has been removed, the new seal is inserted in mesh weave 14 by depressing the open end 20 of the mesh. Boss 15 is now made to go around the crankshaft journal from the starting position by pushing on the cable. The boss is then inserted into the T-shaped handle and the seal is slowly pulled into place while rotating the crankshaft. The excess seal is packed in the seal retainer and should not be cut off.

In constructing the tool herein described for use as a seal remover, the T-shaped handle is made of stainless steel tubing. The cable and mesh are made out of woven stainless steel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

A hand tool for facilitating the insertion of a seal packing material into a narrow groove formed to receive said packing material, said tool comprising in combination, a bar designed to provide a T-shaped grip having a slot retaining means at the center thereof, said slot retaining means having an upper section conforming to the shape of a boss to be inserted in said slot and a lower section adapted to stop penetration of said boss further into said slot but permitting a cable to penetrate therethrough;

a boss adapted to fit into said upper section and to be readily detachable therefrom;

a single strand of cable attached to said boss at the outer end of said cable, said cable being retained in said lower section of said slot retaining means;

a mesh comprising an extension of said cable at the inner end of said cable, said mesh terminating in an open end designed to retain therein an elongated resilient seal packing material, said mesh having a widened throat towards said open end so that said mesh throat will widen upon depressing said open end for insertion of said seal packing material and narrow when upon discontinuing said depressing so that said material will be gripped by said mesh.

References Cited by the Examiner

UNITED STATES PATENTS

| | | | |
|---|---|---|---|
| 1,514,412 | 11/24 | Wilkinson | 24—276 |
| 1,949,601 | 3/34 | Burd | 24—123 |
| 2,591,925 | 4/52 | Erbe | 287—103 |
| 2,766,501 | 10/56 | Kellems. | |
| 2,828,156 | 3/58 | Hansen. | |
| 3,029,503 | 4/62 | Meyer | 29—283 |

WILLIAM FELDMAN, *Primary Examiner.*

NEDWIN BERGER, MYRON C. KRUSE, *Examiners.*